United States Patent [19]

Kan

[11] Patent Number: 4,631,233

[45] Date of Patent: Dec. 23, 1986

[54] ADHESION OF LATEX COATINGS TO POLYMERIC SURFACES

[75] Inventor: Charles S. Kan, Midland, Mich.

[73] Assignee: The Dow Chemical Company, Midland, Mich.

[21] Appl. No.: 812,437

[22] Filed: Dec. 23, 1985

[51] Int. Cl.$^4$ ............................ B32B 7/10; B05D 5/00
[52] U.S. Cl. ................................. 428/420; 427/393.5; 427/400
[58] Field of Search .................... 427/400, 333, 393.5; 428/420

[56] References Cited

U.S. PATENT DOCUMENTS

| | | | |
|---|---|---|---|
| 4,331,800 | 5/1982 | Inata et al. | 528/291 X |
| 4,361,626 | 11/1982 | Boba et al. | 427/333 X |
| 4,590,241 | 5/1986 | Hohlfeld | 525/132 |

Primary Examiner—Evan K. Lawrence

[57] ABSTRACT

A process for adhering a latex film to a polymeric substrate through the formation of covalent bonds at the interface of the polymeric substrate and the latex film. The covalent bonds are formed through the reaction of a cyclic imino ether group, 2-alkenyl-2-oxazoline, and a coreactive group, active hydrogen, epoxy or anhydride group, one of which is present in the polymeric substrate and the other of which is present in the latex. A product prepared from the improved method of adhering a latex film to a polymeric substrate is also included.

18 Claims, No Drawings

ADHESION OF LATEX COATINGS TO POLYMERIC SURFACES

BACKGROUND OF THE INVENTION

The present invention is directed toward the preparation of latex films having improved adhesion to polymeric substrates. The adhesion is provided through the formation of covalent bonds between the latex film formed from an application of an aqueous dispersion of polymeric particles and the polymeric surface. The bond formed is resistant to hydrolyzing and therefore is resistant to delamination under high humidity conditions.

Generally, it is very desirable to coat plastic or other polymeric surfaces with a latex composition. Unfortunately, latex films do not adhere well to the polymeric surfaces. This is in part due to the low surface energy, i.e., non-wettability, and nonpolar or hydrophobic characteristics of the plastic or polymeric surface and the aqueous nature of latex compositions. Even further, once an attempt to coat a plastic or polymeric surface is successful, usually the latex film so formed is very susceptible to delamination in the presence of water or humidity.

Thus, the formation of a bonding mechanism between the plastic or polymeric surface and the latex film is desirable. One such attempt is to employ a corona treatment to the polymeric surface to be coated which places a polar group on the surface and facilitates the application of the latex composition. However, this is not always effective in adhering the dried latex film to the treated polymeric surface.

Another attempt to improve adhesion is to roughen the substrate surface. Although this may improve the apparant contact angle and assist in the formation of a latex film, the film is still susceptible to delamination under various environmental conditions.

One area where it is very desirable to coat a plastic surface with a latex is in the preparation of plastic substrates with polyvinylidene chloride latex films to improve their barrier resistance. Polyvinylidene chloride latex films or, more commonly, saran latexes are especially effective to reduce the permeability of gases such as oxygen, carbon dioxide and vapors such as water through the plastic. However, problems exist in applying an adherent latex film to a plastic surface as mentioned earlier. It is especially difficult to maintain an adherent film under high humidity conditions.

Adhesion of the latex coating to the plastic substrate is a critical property requirement especially in humid environments. For example, where a polyvinylidene chloride latex coated plastic is employed to package beverages or food with substantial water content.

SUMMARY OF THE INVENTION

The present invention is directed toward a process for adhering a latex film to a polymeric substrate. The process involves contacting a polymeric substrate comprising a cyclic imino ether group with a latex comprising a coreactive group whereby covalent bonds are formed at the interface of the polymeric substrate and the latex film. Preferably, the substrate contains from about 1.0 to about 10 percent by total polymer weight of the cyclic imino ether group. The latex contains the coreactive group in an amount of about 0.01 to about 10 percent by total polymer weight of the latex.

In one aspect, the cyclic imino ether group is a 2-alkenyl-2-oxazoline, preferably 2-isopropenyl-2-oxazoline. The coreactive group can be an electrophilic group containing an active hydrogen, an epoxy or anhydride group. Typical examples of an electrophilic group containing an active hydrogen are amines, carboxylic acids, hydroxyls or mercaptan groups.

In yet another aspect, the process comprises contacting a latex having a cyclic imino ether group with a polymeric substrate having a coreactive group whereby covalent bonds are formed at the interface of the latex film and the polymeric substrate. The cyclic imino ether group is present in the latex in an amount of from about 1.0 to about 10 percent by total polymer weight of the latex. The coreactive group is present in an amount of about 0.01 to about 10 percent by total polymer weight of the polymeric substrate. The preferred cyclic imino ether group is a 2-alkenyl-2-oxazoline, preferably 2-isopropenyl-2-oxazoline.

The present invention also includes a product prepared by either of the processes aforementioned. Especially desirable are products prepared with a latex of polyvinylidene chloride which will improve the barrier resistance of a polymeric substrate. For instance, a styrene container can be coated with a polyvinylidene chloride latex film having excellent resistance to delamination under a variety of environmental conditions.

The present invention provides for the formation of covalent bonds between the polymeric surface and the latex film. Through this bonding mechanism, the latex film is more easily applied, maintained and resistant to delamination under various environmental conditions.

DETAILED DESCRIPTION OF THE INVENTION

The present invention provides for an improved adhesion between latex compositions and polymeric or plastic substrates. The adhesion is provided by the formation of a chemical bond between the latex and substrate. The chemical bond is a covalent bond formed through the interaction of reactive groups present in the latex composition and the surface of the substrate.

The covalent bond is formed by the reaction of a cyclic imino ether group or oxazoline ring with a coreactive group. Typically, the coreactive group and the oxazoline group react upon contacting each other by a ring opening reaction to form the covalent bond. A strong interfacial adhesion is thereby achieved between the polymers comprising the latex and the substrate wherein each has either the oxazoline or coreactive group present in the polymeric formulation as described below.

In a preferred embodiment, the cyclic imino ether group or oxazoline group is present in the plastic or polymeric substrate. The oxazoline can be provided by a polystyrene copolymer having from about 1.0 to about 10 percent by total polymer weight of an oxazoline group. Thus, the latex composition contains the coreactive group in an amount sufficient to react with the oxazoline rings, generally from about 0.01 to about 10 weight percent of the polymer. Typically, the latex can comprise polyvinylidene chloride polymer having a coreactive amount of a vinyl acid group.

While the above represents the preferred embodiment, the coreactive group can be present in the substrate while the cyclic imino ether group or the oxazoline group is present in the latex. This situation would also form the necessary covalent bond which would provide improved adhesion between the latex composition and polymeric or plastic substrate.

Thus, the present invention requires a polymer having a pendent cyclic imino ether group. The subject cyclic imino ether groups are structurally depicted as follows:

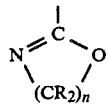

wherein each R is independently hydrogen, or an inertly substituted hydrocarbon containing 1 to 18 carbon atoms; and n is a number from about 1 to about 5. Said cyclic imino ether group can be attached to the polymer chain through any of the carbon atoms in the ring. Preferably, the cyclic imino ether is a 2-imino ether, i.e., is attached to the polymer chain through the 2-carbon atom to yield a structure as defined above. Preferably, each R is hydrogen or lower alkyl and n is 1, 2 or 3. Most preferably, each R is hydrogen, n is 2 and the cyclic imino ether is a 2-oxazoline group. By "inertly substituted" it is meant that the hydrocarbon group contains no functional group which interferes with the polymerization or curing of the oxazoline group.

Polymers containing repeating units having pendent cyclic imino ether groups are advantageously prepared by the polymerization of a monomer mixture comprising an ethylenically unsaturated monomer containing a cyclic imino ether group. Preferably, such monomer is a 2-alkenyl-2-oxazoline wherein said alkenyl group contains from about 2 to about 8, preferably 2 to 4 carbon atoms. Most preferably said monomer is 2-isopropenyl-2-oxazoline (isopropenyl-oxazoline or IPO). Polymers of 2-isopropenyl-2-oxazoline are preferred because of their excellent stability under various molding and extrusion conditions thereby greatly facilitating the preparation of a wide variety of substrates.

Polymers containing pendent cyclic imino ether groups are reacted with polymers containing coreactive groups at the interfacial surface. The coreactive group may be pendent to the polymer, may form terminal groups thereon or may be incorporated into the polymer backbone thereof. Coreactive groups are electrophilic groups containing an active hydrogen, an epoxy or an anhydride group. Typical examples of an active hydrogen group are an amine, carboxylic acid, hydroxyl, or mercaptan group. Polymers containing coreactive groups along the polymer backbone include, for example, polyamines, such as the diverse polyalkylene amines; and the like. Polymers containing terminal coreactive groups include, for example, diverse polysulfides (THIOKOLS), epoxy resins and polyalkylene glycols.

Generally, polymers which can be employed to form covalent bonds with the cyclic imino ether containing polymers have coreactive groups derived from an addition polymerizable monomer containing the desired coreactive group. Preferred are polymers or copolymers having repeating units derived from $\alpha,\beta$-ethylenically unsaturated monomers containing the coreactive groups. Examples are polymers of unsaturated carboxylic acids, such as acrylic acid, methacrylic acid, itaconic acid, maleic acid, and the like; unsaturated amines, such as vinyl amines, and the like; and epoxy groups such as oxirane. In addition, polymers of other monomers which can be chemically modified to form pendent coreactive groups in the polymers such as acrylonitrile, are usefully employed herein.

The polymer contains at least a sufficient amount of the coreactive groups to effectively form sufficient covalent bonds with the cyclic imino ether groups present on the other polymer to adhesively bind the two together. The amount of the coreactive group necessary in order to form this bond will depend on the particular polymers employed in the layers as well as the relative proportion of the polymer and imino ether groups present. However, as with the imino ether group, a sufficient amount of the coreactive group is typically present when at least about 0.01 weight percent of the polymer contains coreactive groups. When the coreactive group is an inherent part of the structure of the homopolymer backbone, as many as a 100 weight percent of such repeating units in the polymer may contain coreactive groups. Typically, when the coreactive group is a pendent group incorporated into a polymer for the primary purpose of chemically bonding the latex film of this invention, it is preferred that the repeating units containing said coreactive groups comprise from about 0.01 to about 10, more preferably from about 0.1 to about 5, weight percent of the polymer.

Whereas, the amount of coreactive groups present in the polymer layer can be adjusted and whereas the pendent cyclic imino ether group present in the other polymer can be adjusted, one can selectively determine the amount of functional groups present at the interfacial surface and thus control the interfacial adhesion of the respective polymers. That is, an excess of functional groups (i.e., cyclic imino ether or coreactive groups) present at the interfacial surface will form a tenacious and very strong bond, whereas by adjusting the functional groups in the polymer layers to contain only a minor amount of functional groups would form a weak but still chemical adhesive bond between the polymers. Adjusting the functional groups anywhere between these two extremes would allow the practitioner to form latex films having a varying degree of adhesive qualities. Likewise, by being able to vary the degree of adhesion, the mechanical properties of the latex film and substrate can be influenced such as tensile, impact strength and ductility.

Thus, in adhering a latex film to a substrate having improved adhesion, one of the polymers must be a polymer of a monomer which (a) can be modified to contain pendent cyclic imino ether groups or (b) can be copolymerized with a monomer which contains or can be modified to contain pendent cyclic imino ether groups. In a preferred embodiment, the substrate is advantageously a polymer of an addition polymerizable monomer copolymerizable with a monomer of an ethylenically unsaturated cyclic imino ether, for example styrene-isopropenyl oxazoline copolymer.

Other addition polymerizable monomers can be polymers of a lower alkene, particularly a $C_1$–$C_8$ alkene, more particularly, ethylene or propylene as well as copolymers thereof; a conjugated diene such as butadiene or isoprene as well as copolymers thereof; also, a vinylidene halide such as vinylidene chloride or copolymers thereof; vinyl acetate; an ether of an $\alpha,\beta$-ethylenically unsaturated carboxylic acid such as alkyl esters of acrylic or methacrylic acid and copolymers thereof; a monovinylidene aromatic compound such as styrene, vinyltoluene, t-butyl styrene, vinylnaphthalene and the like. Ethylenically unsaturated cyclic imino ethers, in particular 2-alkenyl-2-oxazolines, generally resemble styrene in their polymerization reactions. Accordingly, as a rule of thumb, polymers of monomers which are copolymerizable with styrene will generally be usefully employed herein. Due to the polymerization reactions of 2-alkenyl-2-oxazolines and the tendency for styrenic polymers to be incompatible with a wide range of other thermoplastic materials, it is preferred that the first polymer be a polymer of a 2-alkenyl-2-oxazoline and styrene, especially 2-isopropenyl-2-oxazoline and styrene.

In the preparation of the subject invention, one of the polymers must contain a coreactive group as described hereinbefore. In order to be useful herein, said polymer is generally a copolymer of an addition polymerizable monomer which contains said coreactive group or which can be treated subsequent to polymerization to impart the coreactive group thereto. For example, any of the aforementioned addition polymers can be copolymerized with an addition polymerizable carboxylic acid, vinyl acid, to impart carboxyl groups to the polymer. Amino groups, amide groups and the like coreactive groups can be imparted to the polymer in a similar manner by copolymerizing a monomer mixture containing the desired proportion of an addition polymerizable monomer containing such group. Also, graft or block copolymers wherein at least one of the grafted segments or blocks contain a reactive group can be employed herein. In a preferred embodiment, the latex composition will comprise the coreactive group.

Functionalized copolymers can be employed to provide a source of coreactive groups such as vinylidene chloride/methacrylic acid, ethylene/acrylic acid, maleic anhydride or methacrylic acid, styrene/acrylic acid or maleic anhydride, and graft copolymers thereof. Grafted copolymers can generally include a polyolefin and a coreactive group, for example, polyethylene/maleic anhydride copolymer.

More conveniently, polymers which already contain coreactive groups may be employed which will avoid the step of having to treat the polymer to provide the coreactive group. For instance, polymers which inherently have an electrophilic group containing an active hydrogen in the polymer chain or end groups thereof are suitable. For example, polymers containing repeating amine linkages, such as poly(ethyleneimine) or a partially hydrolyzed poly(2-alkyl-2-oxazoline) are suitable as the other polymer herein. Suitable polymers include those which contain amine, carboxylic acid, hydroxyl, mercaptan, and the like groups in the polymer chain or as end groups thereof. However, more preferable, for purposes of forming a structure having improved permeability to gases and moisture would be a latex polymer of vinylidene chloride with a vinyl acid component as the coreactive group.

EXAMPLE I

The results of adhesion for a series of latex composition to a polymer substrate are shown below in Table II. The substrate was a styrene isopropenyl-2-oxazoline copolymer which was 5 percent by total polymer weight isopropenyl-2-oxazoline (IPO). The latex compositions tested are shown in Table I. All are shown in parts based on one hundred parts polymer.

TABLE I

| Latex Designation | Polymer Content |
|---|---|
| A | 90.5 VDC/9.5 MA |
| B | 92 VDC/6 MMA/2 MA |
| C | 90.5 VDC/8.5 MA/.5 AA |
| D | 90.5 VDC/7.5 MA/2 AA |
| E | 90.5 VDC/5.5 MA/4 AA |
| F | 92 VDC/6 MMA/2 MA/1.5 AA |

VDC — vinylidene chloride
MA — methylacrylate
MMA — methyl methacrylate
AA — acrylic acid A polystyrene/IPO substrate was coated with each latex and samples dried at 80° C. for 30 seconds in a forced-air oven. The latex coatings were crystallized and cured at 60° C. for at least 24 hours before testing. The samples were immersed in 55° C. water and periodically removed, dried and a peel adhesion test conducted. The peel adhesion test consisted of rapidly pulling 4 inches of No. 810 Scotch ® tape attached to the latex film coated substrate. The adhesive strength of the latex coating was determined by how long the latex resisted being pulled from the substrate. The results shown in Table II indicate the length of immersion required before the latex film pulled off the substrate as Time 1 ($T_1$) and the length of immersion before the latex first showed signs of delamination as Time 2 ($T_2$).

TABLE II

| | Immersion Time | |
|---|---|---|
| Latex | $T_1$ | $T_2$ |
| A* | <5 min. | — |
| B* | <5 min. | — |
| C | >500 hrs. | 1 hr. |
| D | >500 hrs. | 2 hrs. |
| E | >500 hrs. | none |
| F | >500 hrs. | none |

*Not examples of the invention.
$T_1$ Time until latex pulled off substrate.
$T_2$ Time until latex exhibited signs of delamination.

The results indicate that latex compositions A and B (which did not contain the coreactive group) did not exhibit good adhesion. Whereas latexes C–F, inclusive, (which had a portion of their composition containing coreactive groups) exhibited excellent adhesion. It is concluded that the coreactive group provided by the carboxylic acid content of latexes C–F, inclusive, reacted across the interface with the IPO present in the polymeric substrate to form covalent bonds. Thus, the covalent bonding of the latex film to the polymeric substrate provided improved adhesion and resistance to delamination.

EXAMPLE II

To further demonstrate the improvement in adhesion between latexes having a coreactive group and a polymeric substrate having an IPO group, latexes of polyvinylidene chloride (G and H) were prepared with 1 and 4 parts of acrylic acid, respectively, and coated on a styrenic substrate having no IPO groups and a styrenic substrate having 5 percent by total polymer weight IPO. The test samples were prepared as in Example I and immersed in water at 55° C. The adhesion tests were conducted as in Example I.

TABLE III

| Substrate | Latex G | Latex H |
| --- | --- | --- |
| No IPO* | | |
| T₁ | <5 min. | <10 min. |
| T₂ | — | — |
| 5 percent IPO | | |
| T₁ | >500 hr. | >500 hr. |
| T₂ | None | 10 min. |

*Not an example of the invention.
T₁ Time until latex pulled off substrate.
T₂ Time until latex exhibited signs of delamination.

Table III indicates that the presence of coreactive group in the latex provided no adhesion and yielded typical results for a polymeric substrate coated with a latex when the substrate did not contain IPO. Meanwhile, a substrate having IPO present therein in conjunction with the same latexes having coreactive groups gave very good adhesive characteristics.

What is claimed is:

1. A process for adhering a latex film to a polymeric substrate comprising:
    contacting a polymeric substrate comprising a cyclic imino ether group, with a latex comprising a coreactive group to form a latex film whereby covalent bonds are formed at the interface of said polymeric substrate and said latex film.

2. The process of claim 1 where said cyclic imino ether group is present in an amount of about 1.0 to about 10 percent by total polymer weight of said substrate.

3. The process of claim 1 where said coreactive group is present in an amount of about 0.01 to about 10 percent by total polymer weight of said latex.

4. The process of claim 1 where said cyclic imino ether group is a 2-alkenyl-2-oxazoline.

5. The process of claim 4 where said 2-alkenyl-2-oxazoline is 2-isopropenyl-2-oxazoline.

6. The process of claim 1 where said polymeric substrate additionally comprises a polymer or copolymer of styrene.

7. The process of claim 1 where said latex additionally comprises a polymer or copolymer of vinylidene chloride.

8. The process of claim 1 where said coreactive group is an electrophilic group containing an active hydrogen, an epoxy group or an anhydride group.

9. The process of claim 8 where said electrophilic group containing an active hydrogen is selected from the group consisting of an amine, carboxylic acid, hydroxyl and a mercaptan.

10. a product prepared by the process of claim 1.

11. A process for adhering a latex film to polymeric substrate comprising:
    contacting a latex comprising a cyclic imino ether group, with a polymeric substrate comprising a coreactive group to form a latex film whereby covalent bonds are formed at the interface of said latex film and said polymeric substrate.

12. The process of claim 11 where said cyclic imino ether group is present in an amount of about 1.0 to about 10 percent by total polymer weight of said latex.

13. The process of claim 11 where said coreactive group is present in an amount of about 0.01 to about 10 percent by total polymer weight of said polymeric substrate.

14. The process of claim 11 where said cyclic imino ether group is a 2-alkenyl-2-oxazoline.

15. The process of claim 14 where said 2-alkenyl-2-oxazoline is 2-isopropenyl-2-oxazoline.

16. The process of claim 11 where said coreactive group is an electrophilic group containing an active hydrogen, an epoxy group, or an anhydride group.

17. The process of claim 16 where said electrophilic group containing an active hydrogen is selected from the group consisting of an amine, carboxylic acid, hydroxyl and a mercaptan.

18. A product prepared by the process of claim 11.

* * * * *